US010027388B2

(12) United States Patent
Zhu et al.

(10) Patent No.: US 10,027,388 B2
(45) Date of Patent: Jul. 17, 2018

(54) WIRELESS TRANSMISSION PRECODING (71) Applicant: Intel IP Corporation, Santa Clara, CA (US)

(72) Inventors: Yuan Zhu, Beijing (CN); Qinghua Li, San Ramon, CA (US); Xiaogang Chen, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 24 days.

(21) Appl. No.: 14/778,040

(22) PCT Filed: Dec. 13, 2013

(86) PCT No.: PCT/US2013/075161
§ 371 (c)(1),
(2) Date: Sep. 17, 2015

(87) PCT Pub. No.: WO2014/175926
PCT Pub. Date: Oct. 30, 2014

(65) Prior Publication Data
US 2016/0308593 A1     Oct. 20, 2016

Related U.S. Application Data (60) Provisional application No. 61/816,662, filed on Apr. 26, 2013, provisional application No. 61/824,338, filed on May 16, 2013.

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0469* (2013.01); *H04B 7/0486* (2013.01);
(Continued)

(58) Field of Classification Search
CPC .................................................. H04B 7/0469
See application file for complete search history.

(56) References Cited

U.S. PATENT DOCUMENTS 9,319,121 B2 *   4/2016   Onggosanusi ....... H04B 7/0469
2010/0208838 A1   8/2010   Lee et al.
(Continued)

FOREIGN PATENT DOCUMENTS

CN     101330479 B     4/2011
TW     201208283 A     2/2012
(Continued)

OTHER PUBLICATIONS

International Search Report and Written Opinion dated Apr. 7, 2014 from International Application No. PCT/US2013/075161.
(Continued)

*Primary Examiner* — Huy D Vu
*Assistant Examiner* — Kevin Cunningham
(74) *Attorney, Agent, or Firm* — Schwabe, Williamson & Wyatt, P.C.

(57) ABSTRACT

Embodiments of the present disclosure describe systems and methods for precoding wireless transmissions. Various embodiments may precode rank-one or rank-two wireless transmissions onto four antennas. Various embodiments may precode wireless transmissions using a precoding matrix selected from a group of matrices, wherein different groups of matrices differ in total angular region, number of beams, or angular distance between beams. Other embodiments may be described and/or claimed.

24 Claims, 3 Drawing Sheets

(51) Int. Cl.
*H04L 12/933* (2013.01)
*H04W 4/02* (2018.01)
*H04W 28/02* (2009.01)
*H04W 88/02* (2009.01)

(52) U.S. Cl.
CPC ......... *H04B 7/0617* (2013.01); *H04L 49/109* (2013.01); *H04W 4/025* (2013.01); *H04W 28/0263* (2013.01); *H04W 88/02* (2013.01)

(56) References Cited

U.S. PATENT DOCUMENTS

| | | | |
|---|---|---|---|
| 2012/0002750 A1 | 1/2012 | Hooli et al. | |
| 2013/0034179 A1 | 2/2013 | Zhang et al. | |
| 2013/0058424 A1 | 3/2013 | Enescu et al. | |
| 2013/0064129 A1 | 3/2013 | Koivisto et al. | |
| 2014/0301492 A1* | 10/2014 | Xin | H04B 7/0456 375/267 |
| 2014/0328422 A1* | 11/2014 | Chen | H04B 7/0417 375/267 |
| 2014/0355703 A1* | 12/2014 | Schober | H04B 7/0486 375/267 |
| 2016/0006494 A1* | 1/2016 | Yang | H04L 25/0391 370/329 |

FOREIGN PATENT DOCUMENTS

| | | |
|---|---|---|
| TW | 201220746 A | 5/2012 |
| WO | 2013/048505 A1 | 4/2013 |

OTHER PUBLICATIONS

AT&T, "Codebook Design for 4Tx," 3GPP TSG-RAN WG1 #72bis R1-131818, Apr. 15-Apr. 19, 2013, Chicago, USA, 5 pages.

CATT, "4Tx codebook proposal," 3GPP TSG RAN WG1 Meeting #72bis R1-131817, Apr. 15-Apr. 19 2013, Chicago, USA, 3 pages.

Extended European Search Report dated Nov. 22, 2016 from European Patent Application No. 13882926.2, 10 pages.

Alcatel-Lucent et al., "Way Forward on 8Tx Codebook for Rel. 10 DL MIMO," 3GPP TSG RAN WG1 62, R1-104473, Agenda Item: 6.3.3, Aug. 23-27, 2010, Madrid, Spain, 6 pages.

Office Action and Search Report dated Jun. 7, 2017 from Taiwan Divisional Application No. 105128946, 4 pages.

* cited by examiner

WIRELESS TRANSMISSION PRECODING

CROSS REFERENCE TO RELATED APPLICATIONS

This application is a national phase entry under 35 U.S.C. § 371 of International Application No. PCT/US2013/075161, filed Dec. 13, 2013, entitled "WIRELESS TRANSMISSION PRECODING", which claims priority to U.S. Provisional Patent Application No. 61/816,662, filed Apr. 26, 2013, entitled "Advanced Wireless Communication Systems and Techniques," and U.S. Provisional Patent Application No. 61/824,338, filed May 16, 2013, entitled "Advanced Wireless Communication Systems and Techniques," which are hereby incorporated by reference herein in their entireties.

FIELD

Embodiments of the present disclosure generally relate to the field of wireless communication, and more particularly, to wireless transmission precoding.

BACKGROUND

Conventional wireless communication devices using multiple antennas may precode wireless transmissions to map a desired signal to the multiple antennas. Conventional precoding may use fixed quantization constellations that may not be suitable for desirable antenna arrangements, and may not provide satisfactory precoding techniques suitable for four or other numbers of antennas.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe systems and methods for precoding wireless transmissions. Various embodiments may precode rank-one or rank-two wireless transmissions onto four antennas. Various embodiments may precode wireless transmissions using a precoding matrix selected from a set of matrices (a "codebook"), wherein different matrices in the set differ in total angular region, number of beams, or angular distance between beams.

The precoding techniques disclosed herein may provide improvements over conventional precoding in wireless communication. In particular, various embodiments disclosed herein may provide greater flexibility and accuracy in wireless transmissions than achieved with conventional precoding. For example, some of the codebooks disclosed herein may provide quantization constellations for wireless beams that can be selected to adapt to various communication scenarios, as described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

The embodiments described herein may be used in a variety of applications including transmitters and receivers of a mobile wireless radio system. Radio systems specifically included within the scope of the embodiments include, but are not limited to, network interface cards ("NICs"), network adaptors, base stations, access points ("APs"), relay nodes, Node Bs, gateways, bridges, hubs and satellite radiotelephones. Further, the radio systems within the scope of embodiments may include satellite systems, personal communication systems ("PCS"), two-way radio systems, global positioning systems ("GPS"), two-way pagers, personal computers ("PCs") and related peripherals, personal digital assistants ("PDAs"), and personal computing, among others.

Figure 1:
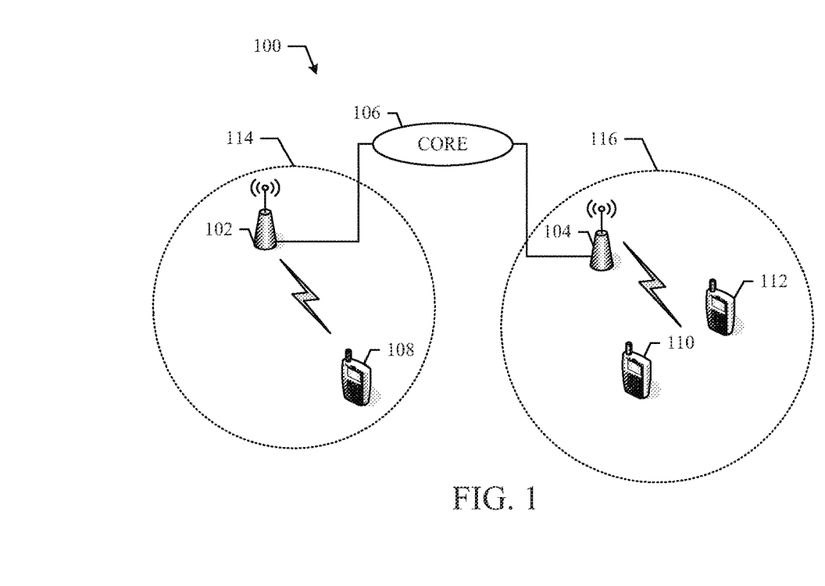
FIG. 1 illustrates an example wireless communication network, in accordance with various embodiments.

Referring now to FIG. 1, an example wireless communication environment 100, in accordance with various embodiments, is illustrated. The wireless communication environment 100 may be configured as one or more wireless communication networks, such as a wireless personal area network ("WPAN"), a wireless local area network ("WLAN"), and a wireless metropolitan area network ("WMAN").

The wireless communication environment 100 may include one or more user equipments ("UEs"), generally shown as 108, 110 and 112, and one or more access nodes ("ANs"), generally shown as 102 and 104. As described below, one or more of the UEs 108, 110 and 112 and ANs 102 and 104 may be configured to support wireless transmission precoding, as described herein. The UEs 108, 110 and 112 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three UEs, the wireless communication environment 100 may include more or fewer UEs.

The UEs 108, 110 and 112 may be configured to communicate via radio links with one or more access nodes ("ANs"), generally shown as 102 and 104. As illustrated in FIG. 1, the AN 102 may serve the UE 108 in a cell 114, and the AN 104 may serve the UEs 110 and 112 in a cell 116. In some embodiments, the ANs 102 and 104 may include or be included in evolved node Bs (eNBs), remote radio heads ("RRHs"), etc. In some embodiments, the ANs 102 and 104 may be eNBs deployed in a heterogeneous network. In such embodiments, the ANs 102 and 104 may be referred to as, for example, femto-, pico-, or macro-eNBs and may be respectively associated with femtocells, picocells, or macrocells.

Wireless communication may include a variety of modulation techniques such as spread spectrum modulation (e.g., direct sequence code division multiple access ("DS-CDMA") and/or frequency hopping code division multiple access ("FH-CDMA"), time-division multiplexing ("TDM") modulation, frequency-division multiplexing ("FDM") modulation, orthogonal frequency-division multiplexing ("OFDM") modulation, multi-carrier modulation ("MDM"), and/or other suitable modulation techniques to communicate via wireless links. The ANs 102 and 104 may be connected to a core network 106, through which authentication and inter-AN communication may occur.

The UEs 108, 110 and 112 may be configured to communicate using a multiple-input and multiple-output ("MIMO") communication scheme. The ANs 102 and 104 may include one or more antennas, radio logic to modulate and/or demodulate signals transmitted or received on an air interface, and digital logic to process signals transmitted and received on the air interface. One or more antennas of the UEs 108, 110 and 112 may be used to concurrently utilize radio resources of multiple respective component carriers (e.g., which may correspond with antennas of ANs 102 and 104) of the wireless communication environment 100.

Embodiments of the systems and methods described herein may be implemented in broadband wireless access networks including networks operating in conformance with one or more protocols specified by 3GPP and its derivatives, the Worldwide Interoperability for Microwave Access ("Wi-MAX") Forum, the IEEE02.16 standards (e.g., IEEE02.16-2005 Amendment), the Long Term Evolution ("LTE") project along with any amendments, updates, and/or revisions (e.g., advanced LTE project, ultra mobile broadband ("UMB") project (also referred to as "3GPP2"), etc.). Many of the examples described herein may refer to wireless communication networks that conform with 3GPP for ease of discussion; however, the subject matter of the present disclosure is not limited in this regard and the described embodiments may apply to other wireless communication networks that may benefit from the systems and techniques described herein, such as specifications and/or standards developed by other special interest groups and/or standard development organizations (e.g., Wireless Fidelity ("Wi-Fi") Alliance, WiMAX Forum, Infrared Data Association ("IrDA"), etc.).

In some embodiments, the AN 102 may be configured to precode wireless transmissions to the UE 108 and/or to other components of the wireless communication environment 100. As used herein, "precoding" may include processing modulated symbols in a wireless transmission onto different antennas with the goal of improving the accuracy of demodulation at the receiver. Some precoding techniques may be represented by a precoding matrix. A precoding matrix may be an m ×n matrix that maps an n-layer transmission (referred to as a "rank n" transmission) to m different antennas. In some embodiments, the AN 102 or another component may select a precoding matrix to be used in downlink communication (e.g., communication with the UE 108). In some embodiments, the AN 102 or other component may select a precoding matrix from a "codebook" of precoding matrices. As used herein, a codebook may refer to a predetermined set of precoding matrices, from which one or more precoding matrices may be selected for precoding wireless transmissions.

For ease of illustration, many of the embodiments discussed below will describe selection of a precoding matrix from a codebook by the AN 102 and/or the UE 108; however, any component in a wireless network environment may select a precoding matrix from a codebook in accordance with the techniques disclosed herein. For example, in some embodiments, a UE (e.g., the UE 108) may transmit an indicator of a recommended rank and a recommended precoding matrix for wireless communication to the AN 102. The AN 102 may use this recommendation in selecting a rank and precoding matrix for use in providing downlink transmissions. The AN 102 and the UE 108 may each store a copy of one or more codebooks from which precoding matrices may be selected, and may signal the selection and recommendation of precoding matrices with reference to the stored codebooks. In some embodiments, the UE 108 may wirelessly transmit a recommendation for a precoding matrix to the AN 102 in the form of one or more precoding matrix indicators ("PMIs"). If the AN 102 selects a precoding matrix other than the recommended matrix, the AN 102 may signal the selected precoding matrix to the UE 108 (e.g., when a common reference signal is used to demodulate data transmissions); otherwise, the AN 102 may simply confirm that the recommended precoding matrix has been selected, or may transmit no confirmation. If a UE-specific reference signal is used to demodulate data transmissions (e.g., instead of a common reference signal), the AN 102 may not have to select the precoding matrix recommended by the UE 108 as long as the same precoding matrix is used to precode both the reference signal and the data. The UE 108 may also wirelessly transmit a recommendation for a rank of downlink transmissions to the AN 102 in the form of a rank indicator ("RI"), in some embodiments. The techniques described herein may be implemented using any arrangement of precoding matrix selection and recommendation signaling.

Figure 2:
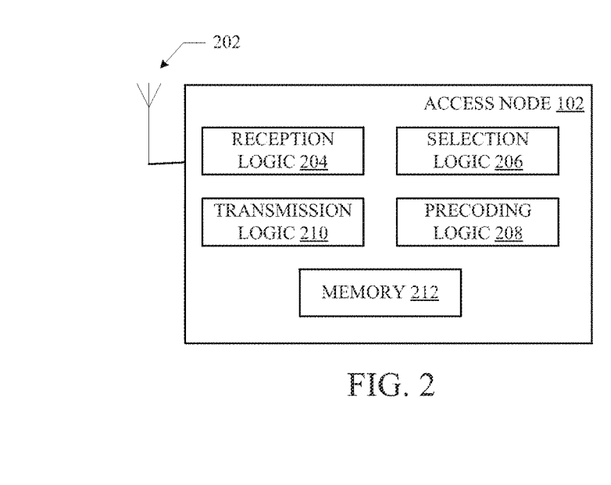
FIG. 2 is a block diagram of an illustrative access node ("AN") configured to precode wireless transmissions, in accordance with various embodiments.

Referring now to FIG. 2, example components of the AN 102 are illustrated. The components of the AN 102, discussed in detail below, may be included in any one or more ANs included in a wireless communication network (e.g., the AN 104 of the wireless communication environment 100). In some embodiments, the AN 102 may be, or may be included in, an eNB. A number of sets of embodiments are discussed below with reference to the AN 102 and the UE 108; embodiments from any one or more of these sets may be combined and used to precode/decode various wireless transmissions in parallel, in series, or in any desired ordering. The AN 102 may include reception logic 204. The reception logic 204 may be coupled with the antenna 202, and may be configured for receiving wired and/or wireless signals from other devices, such as any of the devices discussed above with reference to FIG. 1. For example, the reception logic 204 may be configured to receive wireless signals from a UE (such as the UE 108). Data received by the reception logic 204 may be temporarily or permanently stored in the memory 212. The memory 212 may include any suitable memory device(s) and supporting circuitry, such as the memory devices discussed below with reference to FIG. 6.

In some embodiments, the reception logic 204 may be configured to receive data representative of wireless communication conditions that may affect the choice of precoding matrix for use in precoding a wireless transmission, such as channel quality information, PMI information or RI information. In some other embodiments, the reception logic 204 may be configured to receive data indicative of wireless communication conditions that may affect the choice of precoding matrix for use in precoding a wireless transmission, such as a sounding reference signal. The antenna 202 may include one or more directional or omni-directional antennas such as dipole antennas, monopole antennas, patch antennas, loop antennas, microstrip antennas, and/or other types of antennas suitable for reception and/or transmission of radio frequency ("RF") or other wireless communication signals. Particular antenna configurations are discussed below.

The AN 102 may include selection logic 206. The selection logic 206 may be coupled to the reception logic 204, and may be configured to select a precoding matrix from a set of precoding matrices. The selection logic 206 may use the memory 212 to store any data relevant to precoding, such as the set of precoding matrices (in any desired format or parameterization), an indicator of the selected precoding matrix, an indicator of the rank of the wireless transmission, and/or indicators of the precoding matrix and/or rank recommended by the UE 108, among others. In some embodiments, the selection logic 206 may be configured to select a precoding matrix in accordance with one or more PMIs received from the UE 108 (indicating a recommended precoding matrix), and may be further configured to override the recommendation from the UE 108 and select another precoding matrix under various conditions. For example, in some embodiments (e.g., during retransmission or multiple-user MIMO transmission), the AN 102 may select a precoding matrix which is different from the precoding matrix recommended by the UE 108, and may instead change the transmission rank (e.g., by selecting a precoding matrix having a rank different from the rank of the precoding matrix selected by the UE 108), or rotate the recommended precoding matrix to mitigate interference with co-scheduled UEs, for example.

The AN 102 may include precoding logic 208. The precoding logic 208 may be coupled with the selection logic 206 and may be configured to precode a wireless transmission in accordance with the selected precoding matrix. The precoding logic 208 may use the memory 212 to store any data relevant to precoding, such as the precoded wireless transmission, among others.

In a first set of embodiments, the AN 102 may be configured to precode a rank-one wireless transmission on four antennas. In embodiments in the first set, the selection logic 206 may be configured to select a precoding matrix from a set of matrices consisting of matrix products $W_1(k) W_2(s,i)$. The matrix $W_1(k)$ may be representable as $$W_1(k) = \begin{bmatrix} X_k & 0 \\ 0 & X_k \end{bmatrix} \quad (1)$$

where $$X_k = \begin{bmatrix} 1 & 1 & 1 & 1 \\ q_0^k & q_0^{k+8} & q_0^{k+16} & q_0^{k+24} \end{bmatrix} \quad (2)$$

for k=0, 1, . . . , 15 and where $$q_0 = e^{j2\pi/32}. \quad (3)$$

The matrix $W_2(s,i)$ may be representable as $$W_2(s, i) = \frac{1}{2} \begin{bmatrix} e_{i+1} \\ f^s q_0^{2i} e_{i+1} \end{bmatrix} \quad (4)$$

for s=0, 1, . . . , 3 and i=0, 1, . . . , 3, and where $e_{i+1}$ is a 4×1 vector having all zero entries except an entry of 1 at an (i+1)th position. Precoding matrices constructed in accordance with (1)-(4) may be characterized as representing a rotation in the co-phasing of $W_2(s,i)$ depending on the beam index i in each beam group. This may improve the performance of antennas arranged in a uniform linear array without sacrificing the performance of antennas arranged in a cross-polarized arrangement. This may also improve the performance of any other antenna configurations because this additional rotation doubles the total number of unique codewords in the rank-one codebook. Such a rotation may be applied to other forms of $W_1(k)$, and may result in similar improvements (e.g., by narrowly separating each beam within a group). These antenna arrangements are discussed in additional detail below.

Since $W_1(k)$ is a 4×8 matrix and $W_2(s,i)$ is an 8×1 matrix, the product $W_1(k)W_2(s,i)$ will be a 4×1 matrix, and thus may be used to precode a rank-one transmission onto four antennas. In some embodiments of the first set, the precoding logic 208 may be configured to precode a rank-one wireless transmission in accordance with the precoding matrix selected by the selection logic 206.

The set of matrix products $W_1(k)W_2(s,i)$, in accordance with (1)-(4), is written out as parameterized by k in Table 1. The 16 matrices of Table 1 each correspond to 16 fully expanded matrices (corresponding to the 16 possible values for k), and thus Table 1 provides a codebook having 16×16=256 precoding matrices.

TABLE 1

The set of matrices from which a precoding matrix may be selected in accordance with the first set of embodiments and (1)-(4).

| S | s = 0 | s = 1 | s = 2 | s = 3 |
|---|---|---|---|---|
| i = 0 | $\frac{1}{2}\begin{bmatrix} 1 \\ e^{j2\pi k/32} \\ 1 \\ e^{j2\pi k/32} \end{bmatrix}$ | $\frac{1}{2}\begin{bmatrix} 1 \\ e^{j2\pi k/32} \\ e^{j2\pi \cdot 8/32} \\ e^{j2\pi(k+8)/32} \end{bmatrix}$ | $\frac{1}{2}\begin{bmatrix} 1 \\ e^{j2\pi k/32} \\ e^{j2\pi \cdot 16/32} \\ e^{j2\pi(k+16)/32} \end{bmatrix}$ | $\frac{1}{2}\begin{bmatrix} 1 \\ e^{j2\pi k/32} \\ e^{j2\pi \cdot 24/32} \\ e^{j2\pi(k+24)/32} \end{bmatrix}$ |
| i = 1 | $\frac{1}{2}\begin{bmatrix} 1 \\ e^{j2\pi(k+8)/32} \\ e^{j2\pi \cdot 2/32} \\ e^{j2\pi(k+10)/32} \end{bmatrix}$ | $\frac{1}{2}\begin{bmatrix} 1 \\ e^{j2\pi(k+8)/32} \\ e^{j2\pi \cdot 10/32} \\ e^{j2\pi(k+18)/32} \end{bmatrix}$ | $\frac{1}{2}\begin{bmatrix} 1 \\ e^{j2\pi(k+8)/32} \\ e^{j2\pi \cdot 18/32} \\ e^{j2\pi(k+26)/32} \end{bmatrix}$ | $\frac{1}{2}\begin{bmatrix} 1 \\ e^{j2\pi(k+8)/32} \\ e^{j2\pi \cdot 26/32} \\ e^{j2\pi(k+2)/32} \end{bmatrix}$ |
| i = 2 | $\frac{1}{2}\begin{bmatrix} 1 \\ e^{j2\pi(k+16)/32} \\ e^{j2\pi \cdot 4/32} \\ e^{j2\pi(k+20)/32} \end{bmatrix}$ | $\frac{1}{2}\begin{bmatrix} 1 \\ e^{j2\pi(k+16)/32} \\ e^{j2\pi \cdot 12/32} \\ e^{j2\pi(k+28)/32} \end{bmatrix}$ | $\frac{1}{2}\begin{bmatrix} 1 \\ e^{j2\pi(k+16)/32} \\ e^{j2\pi \cdot 20/32} \\ e^{j2\pi(k+4)/32} \end{bmatrix}$ | $\frac{1}{2}\begin{bmatrix} 1 \\ e^{j2\pi(k+16)/32} \\ e^{j2\pi \cdot 28/32} \\ e^{j2\pi(k+12)/32} \end{bmatrix}$ |
| i = 3 | $\frac{1}{2}\begin{bmatrix} 1 \\ e^{j2\pi(k+24)/32} \\ e^{j2\pi \cdot 6/32} \\ e^{j2\pi(k+30)/32} \end{bmatrix}$ | $\frac{1}{2}\begin{bmatrix} 1 \\ e^{j2\pi(k+24)/32} \\ e^{j2\pi \cdot 14/32} \\ e^{j2\pi(k+6)/32} \end{bmatrix}$ | $\frac{1}{2}\begin{bmatrix} 1 \\ e^{j2\pi(k+24)/32} \\ e^{j2\pi \cdot 22/32} \\ e^{j2\pi(k+14)/32} \end{bmatrix}$ | $\frac{1}{2}\begin{bmatrix} 1 \\ e^{j2\pi(k+24)/32} \\ e^{j2\pi \cdot 30/32} \\ e^{j2\pi(k+22)/32} \end{bmatrix}$ |

As discussed above, the precoding matrices of the first set of embodiments may be determined by calculating the product of $W_1(k)W_2(s,i)$. Carrying out the matrix multiplication may suggest alternate parameterizations of the precoding matrices of the first set of embodiments. For example, the substitution of (2) into (1), followed by the substitution of (4) into (1), may yield:

$$W_1(k)W_2(s, i) = \qquad (5)$$

$$\frac{1}{2}\begin{bmatrix} \begin{bmatrix} 1 & 1 & 1 & 1 \\ q_0^k & q_0^{k+8} & q_0^{k+16} & q_0^{k+24} \end{bmatrix} \\ \begin{bmatrix} 1 & 1 & 1 & 1 \\ q_0^k & q_0^{k+8} & q_0^{k+16} & q_0^{k+24} \end{bmatrix} \end{bmatrix}$$

$$\begin{bmatrix} e_{i+1} \\ j^s q_0^{2i} e_{i+1} \end{bmatrix} = \frac{1}{2}\begin{bmatrix} \begin{bmatrix} 1 \\ q_0^{k+8i} \end{bmatrix} \\ j^s q_0^{2i}\begin{bmatrix} 1 \\ q_0^{k+8i} \end{bmatrix} \end{bmatrix}$$

To simplify this notation, the following quantities may be defined:

$$v_{k+8i} = \begin{bmatrix} 1 \\ q_0^{k+8i} \end{bmatrix}, \qquad (6)$$

$$\varphi_{8s+2i} = j^s q_0^{2i}, \qquad (7)$$

$$m = k + 8i, \text{ and} \qquad (8)$$

$$n = 8s + 2i. \qquad (9)$$

Using (6)-(9), the precoding matrix of (5) may be written as $$\frac{1}{2}\begin{bmatrix} v_m \\ \varphi_n v_m \end{bmatrix} \qquad (10)$$

In the first set of embodiments, the index k may be viewed as providing fine angle adjustment with increment angle $$\frac{2\pi}{32}.$$

Consequently, choosing a desired index k may provide fine tuning within a frequency subband, in some embodiments. In some embodiments, the indices s and i may be chosen to select a beam group and co-phasing between two sets of antennas with different polarizations. In some embodiments, the indices s and i may indicate beam group and co-phasing selections that are suitable for the whole frequency band of wireless communication (e.g., the "wideband"). Thus, in some embodiments, the AN 102 may receive feedback from the UE 108 of appropriate wideband and subband selections. For example, in some embodiments, the AN 102 may receive indicators of two feedback indices from the UE 108, representing wideband and subband feedback, defined in accordance with:

$$i_1 = k, \text{ and} \qquad (11)$$

$$i_2 = 4i + s. \qquad (12)$$

In a second set of embodiments, the AN 102 may be configured to precode a rank-one wireless transmission on four antennas in a manner different than that utilized in the first set of embodiments. In embodiments in the second set, the selection logic 206 may be configured to select a precoding matrix from a set of matrices consisting of matrices that may be representable as $$[1 \quad e^{j\alpha} \quad e^{j\beta} \quad e^{j(\alpha+\beta)}]^T \tag{13}$$

where $$\alpha, \beta \in \left\{\frac{2\pi}{N}i\right\}_{i=1}^{N} \tag{14}$$

and $N \in Z^+$ (the set of positive integers). Since the matrix of (13) is a 4×1 matrix, the matrix of (13) may be used to precode a rank-one transmission onto four antennas.

Figure 3:
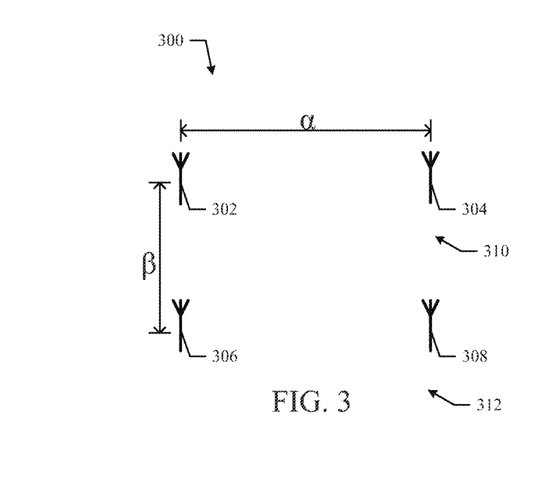
FIG. 3 illustrates an example of a four antenna arrangement that may be included in an AN, in accordance with various embodiments.

Embodiments in the second set may be particularly advantageous for certain arrangements of antennas. FIG. 3 illustrates an example four antennas arrangement 300 that may be included in an AN (e.g., the AN 102), in accordance with various embodiments. The arrangement 300 includes two sets of antennas 310 and 312, including the antennas 302 and 304, and the antennas 306 and 308, respectively. The sets 310 and 312 each have the same spacing between antennas in the set (as shown in FIG. 3, the distance α) and a particular spacing between the sets (as shown in FIG. 3, the distance β). The spacing between antennas (e.g., α and β) may be represented as phase differences, and may fall within the interval [0, 2π]. Arrangements in which the antennas 302 and 304 in the set 310 have a different polarization than the antennas 306 and 308 in the set 312 may be referred to as cross-polarized ("X-pol") arrangements. When the selection logic 206 uses a precoding matrix of the form of (13), the parameters α and β in (5) may be selected to correspond to the α and β of the arrangement 300 of FIG. 3. In particular, in an X-pol arrangement, the α parameter may be used to represent the phase difference between two co-polarized antennas and the β parameters may be used to represent the phase difference between the differently polarized pairs. Since X-pol arrangements are becoming increasingly important in wireless communication, utilizing precoding matrices suited to these arrangements may provide performance benefits. In particular, the use of α and β may provide benefits over techniques in which all antennas are evenly spaced in the quantization constellation; although these techniques may be advantageous for antennas arranged in a uniform linear array ("ULA"), the alternative techniques provided herein may be preferred for X-pol arrangements.

The precoding matrices represented by (13)-(14) above may have a number of advantageous properties. For example, the magnitude of each matrix may be the same for each matrix in the set (e.g., using a Euclidean norm). This may lower the peak-to-average power ratio of a power amplifier used to transmit the precoded wireless transmission (included, e.g., in the transmission logic 210, discussed below) and may also provide backwards compatibility with conventional precoding techniques. The selection of α and β from a finite alphabet may also provide backwards compatibility.

In some embodiments in the second set, the α and β may be independently and randomly distributed over the interval [0, 2π]. In other embodiments, the parameters α and β may be related in accordance with $$\beta = 2\alpha + n\delta \tag{15}$$

where δ is selected from the finite alphabet $$\left\{\frac{2\pi}{N}i\right\}_{i=1}^{N} \tag{16}$$

and $$n \in 0, 1, \ldots, \left\lfloor \frac{2\pi}{\delta} \right\rfloor. \tag{17}$$

The parameter N may take any of a number of values; for example, in some embodiments, N=32. The embodiment of (15)-(17) may synchronize the stepping through of the α and β over the interval [0, 2π] to construct quantization codewords that may improve X-pol performance. In some embodiments, the nδ term may be omitted from (15), which may provide equal spacing and thus be suitable for ULA arrangements. Thus, precoding matrices in the fifth set of embodiments may provide advantageous flexibility. In some embodiments of the second set, the precoding logic 208 may be configured to precode a rank-one wireless transmission in accordance with the precoding matrix selected by the selection logic 206.

In a third set of embodiments, the AN 102 may be configured to precode a rank-two wireless transmission on four antennas. In embodiments in the third set, the selection logic 206 may be configured to select a precoding matrix from a set of matrices consisting of matrix products $W_1(k)W_2(s,i,m)$. The matrix $W_1(k)$ may be representable as described above with reference to (1)-(3), above. The matrix $W_2(s,i,m)$ may be representable as $$W_2(s, i, m) = \frac{1}{2\sqrt{2}} \begin{bmatrix} e_{i+1} & e_{m+1} \\ j^s q_0^{2i} e_{i+1} & -j^s q_0^{2i} e_{m+1} \end{bmatrix} \tag{18}$$

for s=0,1 and (i,m)=(0,0), (1,1), (2,2), (3,3), (0,1), (1,2), (0,3), (1,3). Since $W_1(k)$ is a 4×8 matrix and $W_2(s,i,m)$ is an 8×2 matrix, the product $W_1(k)W_2(s,i,m)$ will be a 4×2 matrix, and thus may be used to precode a rank-two transmission onto four antennas. In some embodiments of the third set, the precoding logic 208 may be configured to precode a rank-two wireless transmission in accordance with the precoding matrix selected by the selection logic 206.

In a fourth set of embodiments, the AN 102 may be configured to precode a rank-two wireless transmission on four antennas in a manner different than that utilized in the third set of embodiments. In embodiments in the fourth set, the selection logic 206 may be configured to select a precoding matrix from a set of matrices consisting of matrix products $W_1(k)W_2(s,i,m)$. The matrix $W_1(k)$ may be representable as described above with reference to (1)-(3). The matrix $W_2(s,i,m)$ may be representable as $$W_2(s, i, m) = \frac{1}{2\sqrt{2}} \begin{bmatrix} e_{i+1} & e_{m+1} \\ j^s q_0^{2m} e_{i+1} & -j^s q_0^{2m} e_{m+1} \end{bmatrix} \tag{19}$$

for s=0,1 and (i,m)=(0,0), (1,1), (2,2), (3,3), (0,1), (1,2), (0,3), (1,3). Since $W_1(k)$ is a 4×8 matrix and $W_2(s,i,m)$ is an 8×2 matrix, the product $W_1(k)W_2(s,i,m)$ will be a 4×2 matrix, and thus may be used to precode a rank-two transmission onto four antennas. In some embodiments of the fourth set, the precoding logic 208 may be configured to precode a rank-two wireless transmission in accordance with the precoding matrix selected by the selection logic 206.

In the first, second, third and fourth sets of embodiments, the selection logic 206 may select a precoding matrix for wireless transmission over four antennas. These sets of embodiments thus may provide codebooks for wireless communication, the codebooks including all of the possible precoding matrices allowed under the various embodiments. Because these codebooks may be formed by multiplying two matrices together (although no multiplication need be performed in various implementations), these codebooks may be referred to as "dual codebooks."

In a fifth set of embodiments, the AN 102 may be configured to precode a wireless transmission to transmit a group of a plurality of beams over a corresponding plurality of antennas. In embodiments in the fifth set, the selection logic 206 may be configured to select, from a set of groups of matrices, a first matrix from a first group as a precoding matrix. The first group may specify 1) a first total angular region over which a first group of plurality of beams may be transmitted, 2) a first number of beams in the first group, and 3) a first angular distance between transmission angles for each beam in the first group.

Figure 4:
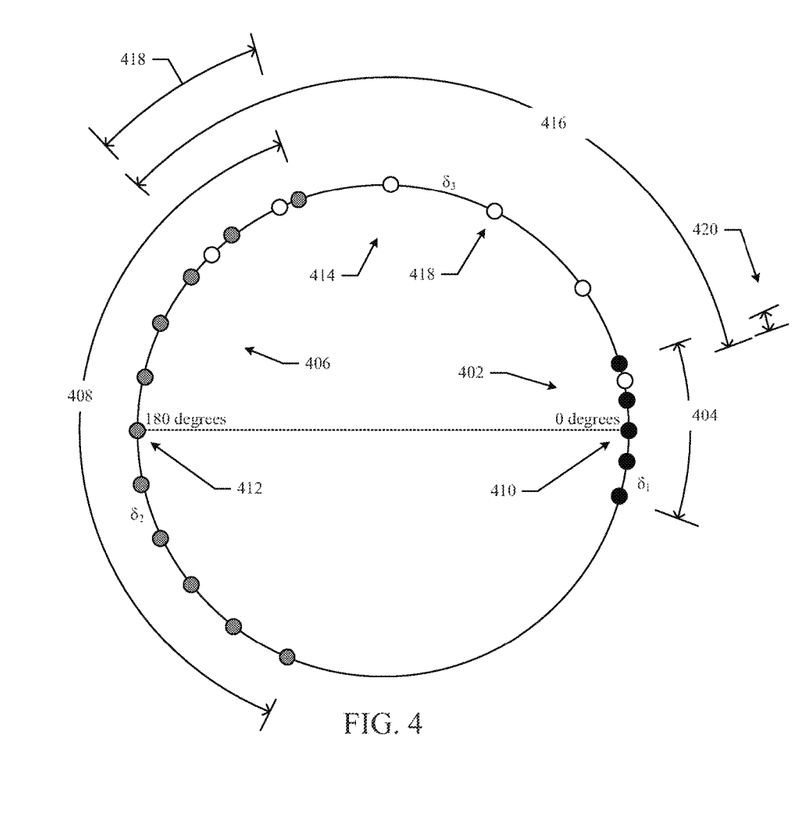
FIG. 4 illustrates groups of transmission beams, each specified by a different group of precoding matrices, in accordance with various embodiments.

FIG. 4 illustrates different groups of transmission beams, each specified by a different group of precoding matrices, in accordance with various embodiments. For example, the group 402 includes a plurality of beams (indicated by black circles), each beam associated with and specified by a precoding matrix. The total angular region over which the group 402 may be transmitted is represented by the angular region 404 in FIG. 4, the number of beams in the group 402 is 5, and the angular distance between transmission angles for each beam in the group 402 is indicated as $\delta_1$. The groups of beams of FIG. 4 may represent embodiments in which multiple antennas are arranged non-linearly; for example, in a circular or cross configuration. The discussion of the fifth set of embodiments herein may also be applied to linear antenna arrays, which have constellations constrained to the 180-degree span on one side of the line of the array.

The set of groups of matrices from which the selection logic 206 may select a precoding matrix may also include a second group specifying 1) a second total angular region over which a second group of a plurality of beams may be transmitted, 2) a second number of beams in the second group, and 3) a second angular distance between transmission angles for each beam in the second group. For example, in FIG. 4, the group 406 includes a plurality of beams (indicated as gray circles). The total angular region over which the group 406 may be transmitted is represented by the angular region 408, the number of beams in the group 406 is 5, and the angular distance between transmission angles for each beam in the group 406 is indicated as $\delta_2$.

In the fifth set of embodiments, the first total angular region may differ from the second total angular region, the first number may differ from the second number, or the first angular distance may differ from the second angular distance. For example, in FIG. 4, the total angular region 404 for the group 402 differs from the total angular region 408 for the group 406. In particular, the total angular region 408 is larger than the total angular region 404. Also in FIG. 4, the number of beams in the group 402 (5 beams) differs from the number of beams in the group 406 (7 beams). Also in FIG. 4, the angular distance between beams in the group 402 ($\delta_1$) is different from the angular distance between beams in the group 406 ($\delta_2$).

In some embodiments of the fifth set, the first group may specify a center angle closer to 0 degrees than a center angle specified by the second group, and the first angular distance may be smaller than the second angular distance. For example, in FIG. 4, the group 402 has a center angle indicated by 410 and the group 406 has a center angle indicated by 412. The center angle 410 (located at 0 degrees) is closer to 0 degrees than the center angle 412 (located at 180 degrees). Additionally, the angular distance between beams in the group 402 ($\delta_1$) is smaller than the angular distance between beams in the group 406 ($\delta_2$).

In some embodiments of the fifth set, the first group may specify a center angle closer to 0 degrees than a center angle specified by the second group, and the first number may be smaller than the second number. For example, as noted above, the center angle 410 of the group 402 (located at 0 degrees) is closer to 0 degrees than the center angle 412 of the group 406 (located at 180 degrees). Additionally, the number of beams in the group 402 (5 beams) is less than the number of beams in the group 406 (7 beams).

The set of groups of matrices from which the selection logic 206 may select a precoding matrix may also include a third group specifying 1) a third total angular region over which a third group of a plurality of beams may be transmitted, 2) a third number of beams in the third group, and 3) a third angular distance between transmission angles for each beam in the second group.

For example, in FIG. 4, the group 414 includes a plurality of beams (indicated as white circles). The total angular region over which the group 414 may be transmitted is represented by the angular region 416, the number of beams in the group 406 is 5, and the angular distance between transmission angles for each beam in the group 406 is indicated as $\delta_3$.

In some embodiments of the fifth set, an angular amount of overlap between the first and second total angular regions may be different from an angular amount of overlap between the first and third total angular regions. For example, the angular amount of overlap between the group 414 and the group 402 (indicated as 420) may be different from the angular amount of overlap between the group 414 and the group 406 (indicated as 418). In some embodiments, the angular amount of overlap between one pair of adjacent groups may be different from the angular amount of overlap between another pair of adjacent groups. Two groups may be adjacent if, for example, no other group has a center angle between the center angles of the two groups.

The groups of precoding matrices of the fifth set of embodiments may provide greater flexibility in precoding than conventional precoding techniques. Some such conventional techniques provide the same number and distribution of beams in each group of beams; for example, each group may cover 40 degrees, and the beams within the group may evenly divide the 40 degrees (e.g., 0-10 degrees, 10-20 degrees, 20-30 degrees and 30-40 degrees). Moreover, in conventional techniques, adjacent groups of beams may overlap to an identical degree (e.g., by half the angular coverage of each group). These "equal spacing" approaches may not be optimal for addressing the needs of multiple antenna configurations in which directionality may play a significant role. In particular, when a wireless communication cell (e.g., the cell 114 of FIG. 1) is sectorized, users (and therefore UEs) are typically not uniformly distributed at all angles around the serving AN (e.g., the AN 102). Instead, the AN may be focused on serving UEs within a narrower angular region (e.g., a 120 degree span from −60 degrees to 60 degrees), and may have a correspondingly sectorized antenna whose ability to receive signals at angles away from the designated sector may exhibit a 3 decibel or greater drop-off.

Thus, it may be desirable to increase the probability that the beamforming angle will center near 0 degrees (or 180 degrees, which may be indistinguishable from 0 degrees for a linear array of antennas facing 0 degrees), and reduce the probability that the beamforming angle will center near 90 degrees. Providing different groups of beams with different properties may advantageously address this issue, as well as others. For example, because the sensitivity of quantization error may be smaller for angles closer to 0 degrees, the number of beams used in groups that center near 0 degrees may be increased to compensate. Additionally or alternatively, the angular distance between the beams may be decreased in groups that center near 0 degrees relative to those that center farther away (which may be advantageous in embodiments in which it is desirable to keep the same number of beams in each group). As noted above, such embodiments may be particularly advantageous in sectorized scenarios in which different sectors of a cell are covered by different antenna arrays (e.g., two or more co-located arrays), instead of or in addition to an omnidirectional antenna. One example embodiment may sectorize a cell into three sectors, each spanning 120 degrees to cover a full 360 degrees. The first sector may span −60 degrees to 60 degrees, the second sector may span 60 degrees to 180 degrees, and the third sector may span −60 to −180 degrees. If the first sector is covered by a first linear antenna array, the radiation may peak at the center angle of 0 degrees and the antenna fain may decrease at angles away from this center angle. The same may be true each of the other two sectors at the center angles 120 degrees and −120 degrees, respectively. The first sector may preferentially receive signals from and transmit signals to UEs closest to its center angle, and signals arriving at the first sector antenna array from angles closer to 90 degrees or −90 degrees may represent signals that were bounced from the two sides of the sector. A signal arriving at an angle of 90 degrees is 90 degrees away from the center of the first sector, but only 30 degrees away from the center of the second sector. Since the antenna gain at an angle of 90 degrees is greater for the second sector antenna array than the first sector antenna array, responsibility for this signal should be given or switched to the second sector. Thus, the first sector need not provide strong coverage for angles near 90 degrees, and thus fewer quantization codewords may be deployed in that direction. In embodiments in which the number of codewords for each group is the same, the group size may be increased. Analogous reasoning may be applied to the second and third sectors, and may be generalized to embodiments with any number of sectors In some embodiments, varying the overlap between adjacent groups may be desirable; for example, it may be advantageous to increase the overlap for angles close to 90 degrees because the additional frequency selectivity at those angles may be compensated for by greater angular variation across the subbands. For example, in sectorized embodiments such as the one discussed above, signals from 90 degrees are likely to be bounced signals, which have a longer propagation delay than direct line-of-sight path signals. The interference between the line-of-sight multipath and the bounced multipath may cause frequency selectively across the bandwidth. The delay between the multipaths may increase with the incoming angle of the bounced multipath. In embodiments in which a single group is used for the entire bandwidth (e.g., a wideband embodiment, as opposed to embodiments in which different groups are used for different subbands), it may be useful to make the total angular region larger to cover a larger variation across the band at 90 degrees. The groups of beams disclosed herein may advantageously provide flexibility and directionality to precoding, improving the performance in sectorized cells.

Returning to FIG. 2, the AN 102 may include transmission logic 210. The transmission logic 210 may be coupled with the precoding logic 208 and may be configured to provide wired and/or wireless signals to other devices, such as any of the devices discussed above with reference to FIG. 1. In particular, the transmission logic 210 may be configured to provide the precoded wireless transmission for transmission to the UE 108. In some embodiments, the transmission logic 210 may provide the precoded wireless transmission by storing data representative of the precoded wireless transmission in a queue for later transmission. This queue may reside in the memory 212. In some embodiments, the transmission logic 210 may provide the precoded wireless transmission by sending the precoded wireless transmission to a UE (e.g., the UE 108) or another device via the antenna 202. In some embodiments, the antenna 202 may include four antennas (e.g., as discussed above). In some embodiments, the antenna 202 may include multiple antennas configured in a particular arrangement, such as a ULA or X-pol arrangement. The transmission logic 210 may also be configured to provide an indicator of the selected rank and/or precoding matrix to another component of the wireless network environment 100, such as the UE 108. As noted above, in some embodiments, this indicator may be a confirmation of a recommendation from another component.

In some embodiments, the UE 108 may be configured to receive and process a wireless transmission precoded in accordance with any of the techniques disclosed herein. In particular, the UE 108 may be configured to select a precoding matrix that corresponds to the precoding matrix used to precode an incoming wireless transmission, and decode the wireless transmission using the selected precoding matrix or a modified precoding matrix based on the selected precoding matrix. In some embodiments, the UE 108 may be configured to recommend a precoding matrix and/or a rank for future downlink transmissions. The UE 108 may be configured to decode a precoded transmission and/or recommend a precoding matrix using any of the sets of matrices ("codebooks") or techniques described herein.

Figure 5:
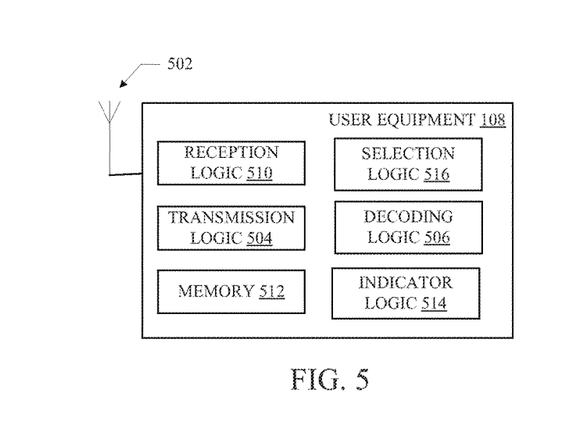
FIG. 5 is a block diagram of an illustrative user equipment ("UE") configured to decode a precoded wireless transmission, in accordance with various embodiments.

Referring now to FIG. 5, example components of the UE 108 are illustrated. The components of the UE 108, discussed in detail below, may be included in any one or more UEs included in a wireless communication network (e.g., the UEs 110 and 112 of the wireless communication environment 100). In some embodiments, the UE 108 may be a smartphone, tablet, wearable computing device, or other wireless communication device.

The UE 108 may include reception logic 510. The reception logic 510 may be configured to receive wired and/or wireless signals from other devices, such as any of the devices discussed above with reference to FIG. 1. The reception logic 510 may be coupled to an antenna 502, which may take the form of any of the antennas described herein (e.g., those described above with reference to the antenna 202 of FIG. 2). Data received by the reception logic 510 may be temporarily or permanently stored in the memory 512, which may take the form of any of the memory devices described herein. In particular, the reception logic 510 may be configured to wirelessly receive precoded wireless transmissions from the AN 102, in accordance with any of the embodiments disclosed herein. The memory 512 may store any data relevant to precoding, such as the set of precoding matrices (in any desired format or parameterization), an indicator of the selected precoding matrix, an indicator of the rank of the wireless transmission, indicators of the recommended precoding matrix and/or rank, and/or the precoded wireless transmission, among others.

The UE 108 may include indicator logic 514. The indicator logic 514 may be configured to generate PMI(s) for transmission to the AN 102 (or any other device that will be precoding a wireless transmission). In some dual codebook implementations, the indicator logic 514 may transmit two PMIs, each corresponding to a different one of the two matrices that may be multiplied together to form the selected precoding matrix. The PMI(s) may indicate the precoding matrix recommended by the UE 108 to precode wireless communications to the UE 108. The indicator logic 514 may be configured to generate an RI for transmission to the AN 102 (or any other device that will be precoding a wireless transmission). The RI may indicate the recommended rank of wireless communications to be transmitted to the UE 108. As noted above, in some embodiments, the indicator logic 514 may provide feedback to the AN 102 to indicate a precoding matrix or group of precoding matrices to be used for the entire frequency band (e.g., in a wideband mode) or may provide feedback specifying different precoding matrices or groups of matrices to be used for different subbands. In some embodiments, a first part of the feedback may be applied to the whole band, and a second part of the feedback may be applied to a subband. The indicator logic 514 may store the PMI(s), the RI, and/or any other feedback in the memory 512.

The UE 108 may include selection logic 516. The selection logic 516 may be coupled to the reception logic 510, and may be configured to select a precoding matrix from a set of precoding matrices. The selection logic 516 may use the memory 212 to store any data relevant to selection of a precoding matrix, such as the set of precoding matrices (in any desired format or parameterization), an indicator of the selected precoding matrix, an indicator of the rank of the wireless transmission, indicators of the precoding matrix and/or rank recommended by the UE 108, and/or the precoded wireless transmission, among others. In some embodiments, the selection logic 206 may be configured to select a precoding matrix that is the same as a precoding matrix recommended by the UE 108 to the AN 102 in PMI(s) (e.g., in response to a confirmation of the PMI from the AN 102). In some embodiments, the selection logic 516 may be configured to select a precoding matrix that is different from a precoding matrix recommended by the UE 108 in response to receiving a wireless transmission that signals the selection of a particular precoding matrix by the AN 102.

The UE 108 may include decoding logic 506. The decoding logic 506 may be coupled to the reception logic 510 and the selection logic 516, and may be configured to decode a precoded wireless transmission received by the reception logic 510 in accordance with the precoding matrix selected by the selection logic 516. The decoding techniques implemented by the decoding logic 506 may be complementary to those used by the AN 102 when precoding the wireless transmission.

The UE 108 may also include transmission logic 504. The transmission logic 504 may be coupled with the antenna 502 and the indicator logic 514, and may be configured for providing wired and/or wireless signals to other devices, such as any of the devices discussed above with reference to FIG. 1. For example, the transmission logic 504 may be configured to provide wireless signals to an AN (such as the AN 102). In some embodiments, the transmission logic 504 may be configured to provide the PMI, RI, or other data representative of one or more wireless communication conditions that may affect the ability of the UE 108 to receive signals from or transmit signals to the AN 102, and thus may affect the choice of precoding matrix at the AN 102.

Figure 6:
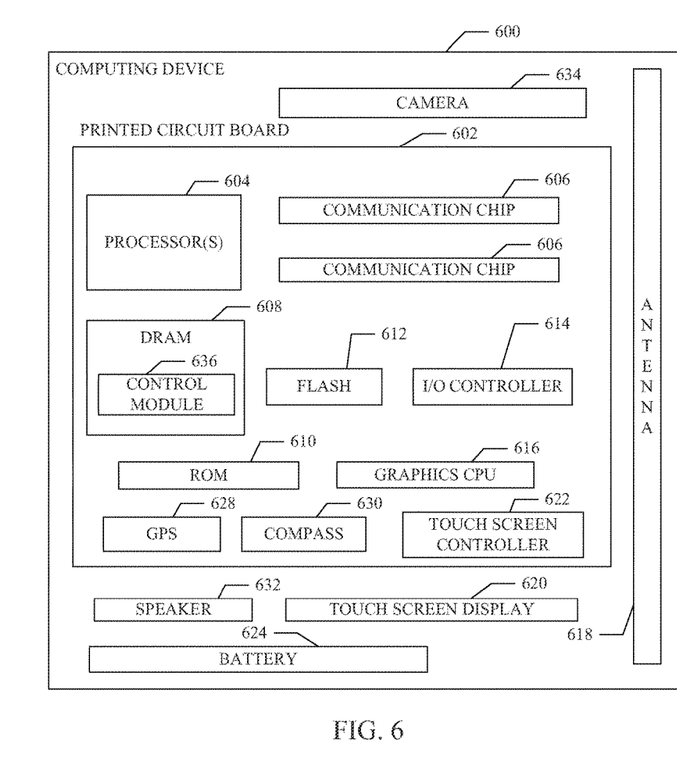
FIG. 6 is a block diagram of an example computing device that may be used to practice various embodiments described herein.

FIG. 6 is a block diagram of an example computing device 600, which may be suitable for practicing various disclosed embodiments. For example, the computing device 600 may serve as the UE 108, the AN 102, or any other suitable device discussed herein. The computing device 600 may include a number of components, including one or more processor(s) 604 and at least one communication chip 606. In various embodiments, the processor 604 may include a processor core. In various embodiments, at least one communication chip 606 may also be physically and electrically coupled to the processor 604. In further implementations, the communication chip 606 may be part of the processor 604. In various embodiments, the computing device 600 may include a PCB 602. For these embodiments, the processor 604 and the communication chip 606 may be disposed thereon. In alternate embodiments, the various components may be coupled without the employment of the PCB 602.

Depending on its applications (e.g., precoding applications), the computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read-only memory 610, also referred to as "ROM," one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other displays (such as liquid-crystal displays, cathode-ray tube displays and e-ink displays, not shown), battery 624, an audio codec (not shown), a video codec (not shown), global positioning system ("GPS") device 628, compass 630, an accelerometer (not shown), a gyroscope (not shown), speaker 632, camera 634, and a mass storage device (such as hard disk drive, a solid state drive, compact disk ("CD"), digital versatile disk ("DVD")) (not shown), any other desired sensors (not shown) and so forth. In various embodiments, the processor 604 may be integrated on the same die with other components to form a System on Chip ("SoC"). Any components included in the computing device 600 (e.g., sensors) may be used in various precoding/decoding applications (e.g., by inclusion in the reception logic 204 of the AN 102, or the reception logic 510 of the UE 108).

In various embodiments, volatile memory (e.g., DRAM 608), non-volatile memory (e.g., ROM 610), flash memory 612, and the mass storage device may include programming instructions configured to enable the computing device 600, in response to execution by the processor(s) 604, to practice all or selected aspects of the processes described herein (e.g., the precoding matrix selection and precoding processes). For example, one or more of the memory components such as volatile memory (e.g., DRAM 608), non-volatile memory (e.g., ROM 610), flash memory 612, and the mass storage device may be machine readable media that include temporal and/or persistent (e.g., non-transitory) copies of instructions that, when executed by the one or more processor(s) 604, enable the computing device 600 to practice all or selected aspects of the processes described herein. Memory accessible to the computing device 600 may include one or more storage resources that are physically part of a device on which the computing device 600 is installed and/or one or more storage resources that is accessible by, but not necessarily a part of, the computing device 600. For example, a storage resource may be accessed by the computing device 600 over a network via the communications chip 606. Any one or more of these memory devices may be included in the memory 212 of the AN 102 or the memory 512 of the UE 108.

The communication chip 606 may enable wired and/or wireless communications for the transfer of data to and from the computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, communication chips 606 may implement any of a number of wireless standards or protocols, including but not limited to IEEE02.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

As discussed above with reference to the AN 102 and the UE 108, in various implementations, the computing device 600 may be a laptop, a netbook, a notebook, an ultrabook, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

The following paragraphs describe examples of various embodiments. Example 1 is an apparatus for precoding wireless transmissions, including selection logic and precoding logic. The selection logic is to select, from a set of groups of matrices, a first matrix from a first group as a precoding matrix, the first group specifying a first total angular region over which a first plurality of beams may be transmitted, a first number of the first plurality of beams, and a first angular distance between transmission angles for each of the first plurality of beams. The precoding logic is to precode a wireless transmission in accordance with the precoding matrix. The set of groups of matrices includes a second group specifying a second total angular region over which a second plurality of beams may be transmitted, a second number of the second plurality of beams, and a second angular distance between transmission angles for each of the second plurality of beams, and the first total angular region differs from the second total angular region, the first number differs from the second number, or the first angular distance differs from the second angular distance.

Example 2 may include the subject matter of Example 1, and may further specify that the first group specifies a center angle closer to 0 degrees than a center angle specified by the second group, and the first angular distance is smaller than the second angular distance.

Example 3 may include the subject matter of any of Examples 1-2, and may further specify that the first group specifies a center angle closer to 0 degrees than a center angle specified by the second group, and the first number is smaller than the second number.

Example 4 may include the subject matter of any of Examples 1-3, and may further specify that the set of groups of matrices further includes a third group specifying a third total angular region over which a third plurality of beams may be transmitted, and wherein an angular amount of overlap between the first and second total angular regions is different from an angular amount of overlap between the first and third total angular regions.

Example 5 is an apparatus for precoding wireless transmissions on four antennas, which may include the subject matter of any of Examples 1-4, and may further specify that the selection logic is to select a precoding matrix from a set of matrices consisting of matrices representable as matrix products $W_1(k)W_2(s,i)$, defined in accordance with (1)-(4), above, and the precoding logic is to precode a rank-one wireless transmission in accordance with the selected precoding matrix.

Example 6 may include the subject matter of Example 5, and may further specify that the selection logic is further to select a second precoding matrix from a set of matrices consisting of matrices representable as matrix products $W_1(k)W_2(s,i,m)$, defined in accordance with (1)-(3) and (18), above, and the precoding logic is further to precode a rank-two wireless transmission in accordance with the selected second precoding matrix.

Example 7 may include the subject matter of any of Examples 5-6, and may further specify that the selection logic is further to select a second precoding matrix from a set of matrices consisting of matrices representable as matrix products $W_1(k)W_2(s,i,m)$, defined in accordance with (1)-(3) and (19), above, and the precoding logic is further to precode a rank-two wireless transmission in accordance with the selected second precoding matrix.

Example 8 is an apparatus for precoding a wireless transmission on four antennas, which may include the subject matter of any of Examples 1-7, and may further specify that the selection logic is to select a precoding matrix from a set of matrices consisting of matrices representable in accordance with (13)-(14), above, and the precoding logic is to precode a rank-one wireless transmission in accordance with the selected precoding matrix.

Example 9 may include the subject matter of Example 8, and may further specify that elements of (13)-(14) are defined in accordance with (15)-(17), above.

Example 10 may include the subject matter of Example 9, and may further specify that N=32.

Example 11 is a method for indicating a precoding matrix, including: selecting a precoding matrix, for precoding a rank-one wireless transmission on four antennas, from a set of matrices consisting of matrices representable as matrix products $W_1(k)W_2(s,i)$ defined in accordance with (1)-(4), above; and providing an indicator of the selected precoding matrix for transmission to a user equipment.

Example 12 may include the subject matter of Example 11, and may further include: selecting a second precoding matrix, for precoding a rank-two wireless transmission on four antennas, from a set of matrices consisting of matrices representable as matrix products $W_1(k)W_2(s,i,m)$ defined in accordance with (1)-(3) and (18), above; and providing an indicator of the second selected precoding matrix for transmission to a user equipment.

Example 13 may include the subject matter of any of Examples 11-12, and may further include: selecting a second precoding matrix, for precoding a rank-one wireless transmission on four antennas, from a set of matrices consisting of matrices representable as matrix products $W_1(k)W_2(s,i,m)$ defined in accordance with (1)-(3) and (19), above; and providing an indicator of the second selected precoding matrix for transmission to a user equipment.

Example 14 is a method for indicating a precoding matrix, which may include the subject matter of any of Examples 11-13, and which may further include: selecting a precoding matrix, for precoding a wireless transmission on four antennas, from a set of matrices consisting of matrices representable in accordance with (13)-(14), above; and providing an indicator of the selected precoding matrix for transmission to a user equipment.

Example 15 may include the subject matter of Example 14, and may further specify that elements of (13)-(14) are defined in accordance with (15)-(17), above.

Example 16 may include the subject matter of Example 15, and may further specify that N=32.

Example 17 is a method for indicating a precoding matrix, which may include the subject matter of any of Examples 11-16, and which may further include: selecting, from a set of groups of matrices, a first matrix from a first group as a precoding matrix, the first group specifying a first total angular region over which a first plurality of beams may be transmitted, a first number of the first plurality of beams, and a first angular distances between transmission angles for each of the first plurality of beams; and providing an indicator of the selected precoding matrix for wireless transmission to a user equipment. The set of groups of matrices includes a second group specifying a second total angular region over which a second plurality of beams may be transmitted, a second number of the second plurality of beams, and a second angular distance between transmission angles for each of the second plurality of beams, and the first total angular region differs from the second total angular region, the first number differs from the second number, or the first angular distance differs from the second angular distance.

Example 18 may include the subject matter of Example 17, and may further specify that the first group specifies a center angle closer to 0 degrees than a center angle specified by the second group, and the first angular distance is smaller than the second angular distance.

Example 19 may include the subject matter of any of Examples 17-18, and may further specify that the first group specifies a center angle closer to 0 degrees than a center angle specified by the second group, and the first number is smaller than the second number.

Example 20 may include the subject matter of any of Examples 17-19, and may further specify that the set of groups of matrices further includes a third group specifying a third total angular region over which a third plurality of beams may be transmitted, and wherein an angular amount of overlap between the first and second total angular regions is different from an angular amount of overlap between the first and third total angular regions.

Example 21 is one or more computer readable media having instructions thereon which, when executed by one or more processing devices of an apparatus, cause the apparatus to perform the method of any of Examples 11-20.

Example 22 is an apparatus including means for performing the method of any of Examples 11-20.

Example 23 is an apparatus for indicating a selected precoding matrix, including selection logic and indicator logic. The selection logic is to select a precoding matrix, for precoding a rank-one wireless transmission on four antennas, from a set of matrices consisting of matrices representable as matrix products $W_1(k)W_2(s,i)$ defined in accordance with (1)-(4), above. The indicator logic is to provide an indicator of the selected precoding matrix for wireless transmission to an access node.

Example 24 may include the subject matter of Example 23, and may further specify that the selection logic is further to select a second precoding matrix, for precoding a rank-two wireless transmission on four antennas, from a set of matrices consisting of matrices representable as matrix products $W_1(k)W_2(s,i,m)$ defined in accordance with (1)-(3) and (18), above, and the indicator logic is further to provide an indicator of the selected second precoding matrix for wireless transmission to an access node.

Example 25 may include the subject matter of any of Examples 23-24, and may further specify that the selection logic is further to select a second precoding matrix, for precoding a rank-two wireless transmission on four antennas, from a set of matrices consisting of matrices representable as matrix products $W_1(k)W_2(s,i,m)$ defined in accordance with (1)-(3) and (19), above, and the indicator logic is further to provide an indicator of the selected second precoding matrix for wireless transmission to an access node.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus for precoding wireless transmissions on four antennas, comprising:
   one or more computing processors;
   selection logic to be operated by the one or more computing processors to select, based on an indicator from a user equipment, a precoding matrix from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for $i=0,1,2,3$, where $e_i$ is a 4×1 vector with all zero entries except a unity at the i-th entry;
   precoding logic to be operated by the one or more computing processors to precode a rank-one wireless transmission in accordance with the selected precoding matrix; and
   four antennas to transmit the precoded rank-one wireless transmission.

2. The apparatus of claim 1, further comprising:
   a touch screen display.

3. The apparatus of claim 1, wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
|---|---|---|---|---|---|---|---|
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2}\begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

4. The apparatus of claim 1, further comprising:
reception logic to receive the indicator from the user equipment, wherein the indicator specifies a particular precoding matrix to be selected by the selection logic.

5. The apparatus of claim 4, further comprising:
one or more antennas, coupled with the reception logic, to receive the indicator from the user equipment.

6. One or more computer readable media having instructions thereon which, when executed by one or more processing devices of an apparatus, cause the apparatus to:
select, based on an indicator from a user equipment, a precoding matrix from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for $i=0,1,2,3$, where $e_i$ is a 4×1 vector with all zero entries except a unity at the i-th entry;
and
precode a rank-one wireless transmission in accordance with the selected precoding matrix; and
transmit the precoded rank-one wireless transmission.

7. The one or more computer readable media of claim 6, wherein the one or more processing devices are included in a System on Chip.

8. The one or more computer readable media of claim 6, wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
|---|---|---|---|---|---|---|---|
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2}\begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

9. The one or more computer readable media of claim 6, further having instructions thereon which, when executed by the one or more processing devices of the apparatus, cause the apparatus to:
receive the indicator from the user equipment, wherein the indicator specifies a particular precoding matrix to be selected by the apparatus.

10. The one or more computer readable media of claim 6, wherein the one or more computer readable media comprises a non-volatile memory.

11. An apparatus for indicating a selected precoding matrix, comprising:
one or more computing processors;
selection logic to be operated by the one or more computing processors to select a precoding matrix, for precoding a rank-one wireless transmission on four antennas, from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for $i=0,1,2,3$, where $e_i$ is a 4×1 vector with all zero entries except a unity at the i-th entry;
and
indicator logic to be operated by the one or more computing processors to provide an indicator of the selected precoding matrix for wireless transmission to an access node; and
transmission logic to wirelessly transmit the indicator to the access node.

12. The apparatus of claim 11,
wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
|---|---|---|---|---|---|---|---|
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2}\begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

one or more antennas to wirelessly transmit the indicator to the access node.

14. The apparatus of claim 11, further comprising a global positioning system device.

15. One or more computer readable media having instructions thereon which, when executed by one or more processing devices of an apparatus, cause the apparatus to:

select a precoding matrix, for precoding a rank-one wireless transmission on four antennas, from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for i=0,1,2,3, where $e_i$ is a 4×1 vector with all zero entries except a unity at the i-th entry; and provide an indicator of the selected precoding matrix for wireless transmission to an access node; and wirelessly transmit the indicator to the access node.

16. The one or more computer readable media of claim 15, wherein the one or more computer readable media comprises a non-volatile memory.

17. The one or more computer readable media of claim 15,
wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
|---|---|---|---|---|---|---|---|
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2} \begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

18. A method for precoding wireless transmissions on four antennas, comprising:

selecting, by a computing device based on an indicator from a user equipment, a precoding matrix from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for i=0,1,2,3, where $e_i$ is a 4×1 vector with all zero entries except a unity at the i-th entry; and precoding, by the computing device, a rank-one wireless transmission in accordance with the selected precoding matrix; and transmitting, by the computing device, the precoded rank-one wireless transmission.

19. The method of claim 18,
wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
|---|---|---|---|---|---|---|---|
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2} \begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

20. The method of claim 18, further comprising:

receiving, by the computing device, the indicator from the user equipment, wherein the indicator specifies a particular precoding matrix to be selected by the computing device.

21. The method of claim 18, wherein the computing device comprises an evolved NodeB(eNB).

22. A method for enabling wireless transmissions on four antennas, comprising:

selecting, by a computing device, a precoding matrix, for precoding a rank-one wireless transmission on four antennas, from a set of matrices, wherein the set of matrices are calculated by using elements of $$\left\{ \begin{bmatrix} Y_i \\ q_0^{2i} Y_i \end{bmatrix}, \begin{bmatrix} Y_i \\ jq_0^{2i} Y_i \end{bmatrix}, \begin{bmatrix} Y_i \\ -q_0^{2i} Y_i \end{bmatrix}, \begin{bmatrix} Y_i \\ -jq_0^{2i} Y_i \end{bmatrix} \right\}, \text{ for } i = 0, 1, 2, 3;$$

$q_0 = e^{j2\pi/32}$, $Y_i = e_i$ for i=0,1,2,3, where $e_i$ is a 4×1 vector with all zero entries except a unity at the i-th entry; and providing, by the computing device, an indicator of the selected precoding matrix for wireless transmission to an access node; and wirelessly transmitting, by the computing device, the indicator to the access node.

23. The method of claim 22, wherein the computing device is a user equipment.

24. The method of claim 22,
wherein the precoding matrix is selected from the set of matrices representable as

| $W_{k,0}$ | $W_{k,8}$ | $W_{k,16}$ | $W_{k,24}$ | $W_{k+8,2}$ | $W_{k+8,10}$ | $W_{k+8,18}$ | $W_{k+8,26}$ |
| --- | --- | --- | --- | --- | --- | --- | --- |
| $W_{k+16,4}$ | $W_{k+16,12}$ | $W_{k+16,20}$ | $W_{k+16,28}$ | $W_{k+24,6}$ | $W_{k+24,14}$ | $W_{k+24,22}$ | $W_{k+24,30}$ | where $$W_{m,n} = \frac{1}{2}\begin{bmatrix} v_m \\ \varphi_n v_m \end{bmatrix}, \varphi_n = e^{j2\pi n/32}, v_m = \begin{bmatrix} 1 \\ q_0^m \end{bmatrix},$$

$q_0 = e^{j2\pi/32}$, and $k = 0, 1, \ldots, 15$.

\* \* \* \* \*